United States Patent [19]

Nardi et al.

[11] Patent Number: 5,165,735
[45] Date of Patent: Nov. 24, 1992

[54] ELECTRICAL FITTING FOR CONDUIT CONNECTION

[75] Inventors: Pierre Nardi, Forest Hills; Lawrence S. Steiner, Dix Hills, both of N.Y.

[73] Assignee: Berger Industries, Inc., Maspeth, N.Y.

[21] Appl. No.: 700,510

[22] Filed: Aug. 14, 1991

[51] Int. Cl.[5] .......................................... F16L 21/00
[52] U.S. Cl. .................................... 285/369; 285/81; 285/403; 285/404; 285/90; 285/322; 403/366
[58] Field of Search ............... 285/369, 410, 366, 411, 285/66, 90, 322, 81, 403, 404; 403/366

[56] References Cited

U.S. PATENT DOCUMENTS

| | | | |
|---|---|---|---|
| 525,009 | 8/1894 | Fiester | 403/366 X |
| 1,005,506 | 10/1911 | Brown | 285/322 |
| 1,284,159 | 11/1918 | Sickman | 285/90 X |
| 1,410,600 | 3/1922 | Roberts | 285/404 X |
| 1,585,951 | 12/1924 | Waller | 285/322 |
| 1,938,974 | 12/1933 | Oldberg | 285/322 X |
| 2,480,895 | 9/1949 | Anderson | 285/322 X |
| 2,702,716 | 2/1955 | Basolo et al. | 285/322 |
| 3,345,087 | 10/1967 | Hanes et al. | 285/90 X |
| 4,068,865 | 1/1978 | Shanks, II | 285/90 |
| 4,114,928 | 9/1978 | Lochte | 285/403 X |

FOREIGN PATENT DOCUMENTS 375904 1/1921 Fed. Rep. of Germany ...... 403/366

Primary Examiner—Randolph A. Reese
Assistant Examiner—Timothy Aberle
Attorney, Agent, or Firm—Howard C. Miskin

[57] ABSTRACT

A conduit coupling device includes a tubular casing with front and rear sections of reduced and enlarged diameters. A pair of relatively diametrically movable arcuate clamp members of channel shape with cross webs and flanges is provided, one of the webs having peripherally extending tongues slidably engaging the other clamp member channel. A radial screw engages a tapped bore in the casing rear section and bears on and is clinched to one of the clamp member webs the other clamp member being fixed to the casing. A pair of the casings may be integrally coaxially formed and house similar clamp assemblies or the casing may terminate in an externally threaded coupling tube projecting coaxially forward from the casing front section.

18 Claims, 2 Drawing Sheets

ELECTRICAL FITTING FOR CONDUIT CONNECTION

BACKGROUND OF THE INVENTION

The present invention generally to improvements in fittings for conduits such as pipes, tubes, ducts and the like and it relates particularly to an improved conduit fitting for connecting sections of conduit securing a conduit to a wall opening and for other applications.

In the transmission of electrical power or signals, it is a conventional practice to house the electrical transmission wire or cable in plastic or thin metal conduits. Since the electrical cable is generally longer than the lengths of the housing conduit sections and the cable terminates at a junction box, it is necessary to firmly connect the proximate ends of successive conduit sections and to firmly connect the terminal end of the joined conduits to a wall of a junction box through an opening of which the cable passes. Moreover, the conduit connections as well as the conduit junction box connection should be of a hermetically sealed nature. A conduit coupling which has heretofore been used consists of a collar oppositely internally threaded at opposite ends. While such coupling is simple and inexpensive, its use is highly inconvenient and awkward, requiring that the ends of the conduit sections be externally threaded to match the coupling threads, a procedure which possesses numerous drawbacks, since such operations are time consuming and require special equipment.

Many coupling connecting devices have been available and suggested which obviate the need of threading the conduit sections. However, these coupling connecting devices, while avoiding the need to thread the conduit, possess other drawbacks. They generally require axial pressure to contract a clamp to the conduit, a procedure which is usually difficult, awkward and inconvenient to properly achieve and otherwise possesses many other drawbacks and disadvantages.

SUMMARY OF THE INVENTION

It is a principal object of the present invention to provide an improved conduit fitting.

Another object of the present invention is to provide an improved fitting for electrical cable or wire carrying conduit.

Still another object of the present invention is to provide an improved coupling for connecting successive sections of electrical conduit.

A further object of the present invention is to provide an improved connector for anchoring a conduit to the wall of a junction box or other equipment.

A still further object of the present invention is to provide a compression fitting that is rain-tight/concrete-tight and leakproof and is easier and faster to install, but yet secure when installed, with good grounding.

Still a further object of the present invention is to provide a device of the above nature characterized by its high reliability, ease and convenience of use and application, low cost and great versatility and adaptability.

The above and other objects of the present invention will become apparent from a reading of the following description taken in conjunction with the accompanying drawings which illustrate preferred embodiments thereof.

A conduit fitting in accordance with the present invention comprises a tubular casing having a tapped radial bore and housed in the casing is a conduit clamp assembly including a pair of interlocking relatively diametrically movable arcuate clamp members coaxial with the casing one of the clamp members being fixed in position in the casing, and a screw member engaging the tapped bore and bearing on the other clamp member. Advantageously, the clamp members are of channel shape transverse cross section with cross webs and peripherally extending inwardly directed flanges with the outer edges preferably sharpened. One of the cross webs terminates in curved opposite peripheral tongues slidably engaging the channel in the other clamp member. An internally threaded tubular projection extends radially from the casing and engages the clamp member bearing screw.

In its preferred form, the casing formed form steel tubing includes a rear radially enlarged portion and a front portion of reduced diameter, a cold flow or elastomeric washer being housed in the casing contiguous the shoulder joining the rear and front portions. The movable clamp member has a circular opening in the cross web intermediate its ends and the screw member terminates in a coaxial stub shaft which rotatably engages the opening and is clinched to retain the screw to the web. When the is used as a conduit section coupler, a second clamp device coaxial with and a mirror image of the first device is integrally formed therewith. When used as a connector to connect the conduit to a junction box wall or the like, the casing front section is externally threaded and engaged by a locked nut.

The improved coupling is simple, reliable and inexpensive, and is secured to a conduit merely by inserting the conduit through the casing rear opening with the clamp in expanded condition and advancing the conduit into full snug engagement with the casing front section and tightening the screw member to tightly clamp the conduit. The device is, moreover, of great versatility and adaptability.

DESCRIPTION OF THE PREFERRED EMBODIMENTS

Figure 1:
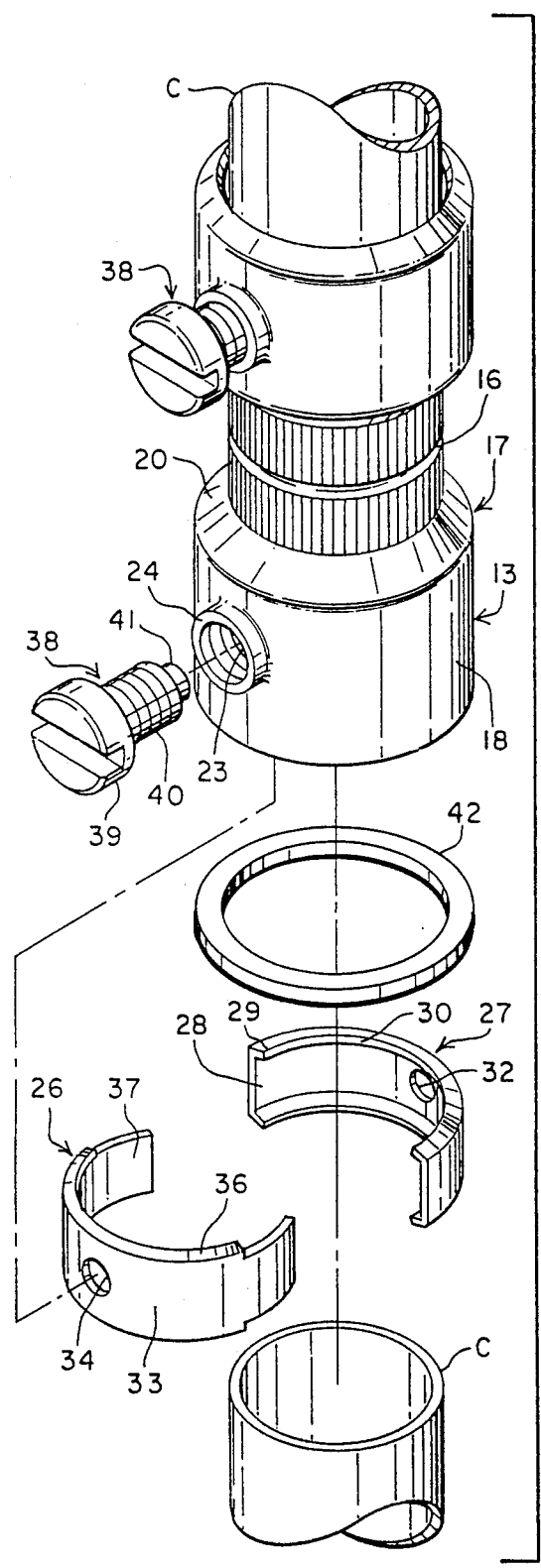
FIG. 1 is a perspective partially exploded view of a coupling device embodying the present invention for use in connecting a pair of conduit sections.
Figure 2:
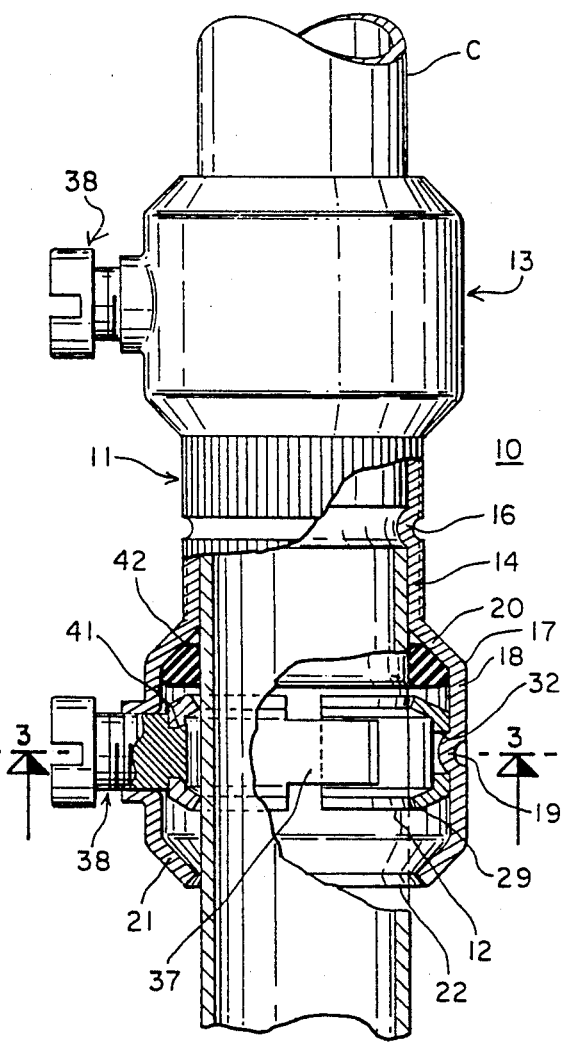
FIG. 2 is a front elevational view thereof in assembled conduit connecting condition shown partially in section.
Figure 3:
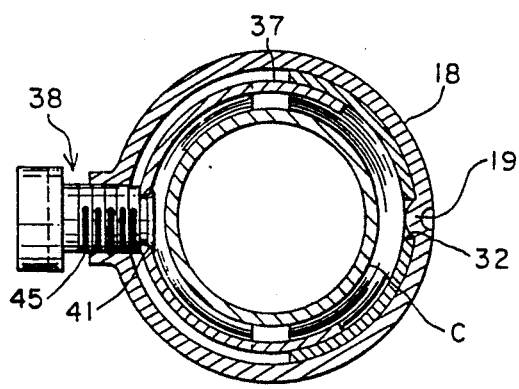
FIG. 3 is a sectional view taken along line 3—3 in FIG. 2.

Referring now to the drawings, particularly FIG. 1 to 3 thereof which illustrate a preferred embodiment of the present invention as an electrical coupling applied to the connection of successive sections of conduit C, the reference numeral 10 generally designates the improved coupling device which comprises an outer tubular body member 11 and a pair of axially spaced conduit clamps 12 housed in body member 11. Body member 11 is symmetrical to a transverse plane to define an integrally formed pair of coaxial end to end tubular casings 13 which are preferably mirror images of each other.

Each casing 13 includes a cylindrical inner front section 14 which is delineated from the front section of the other casing by an inwardly projecting peripheral ridge 16 defining a conduit stop, the inside diameter of front section 14 being approximately equal to outside diameter of conduit C. Rearwardly of front section 14 is a diametrically enlarged rear section 17 which includes a cylindrical wall 18 provided with a radially inwardly projecting positioning dimple 19. A forwardly inwardly inclined peripheral front end wall 20 extends between the front edge of cylindrical wall 18 and the rear edge of inner front section 14 and a rearwardly inwardly inclined rear end flange 21 extends from the rear edge of cylindrical wall 18 and terminates in a peripheral edge delineating a circular opening 22 of slightly greater diameter than the inside diameter of front section 14.

Formed in cylindrical wall 18 intermediate its ends and diametrically opposite dimple 19 is circular opening 23 surrounded by a radially outwardly directed cylindrical collar 24 having a threaded inside face, collar 24 being integrally formed with cylindrical wall 18.

Conduit clamp 12 includes a pair of interlocking opposing first and second arcuate clamp member 26 and 27 respectively which are approximately coaxial with casing 11. Second clamp member 27 is channel shaped and includes a cross web 28 terminating along its longitudinal edges in radially inwardly directed diverging flanges 29 whose inner edges 30 are preferrably sharp. Formed in cross web 28 intermediate its ends is a circular opening 32 which is engaged by dimple 19 to fix the position of clamp member 27 against longitudinal and peripheral movement in casing 11.

The first clamp member 26 is similar in structure to second clamp member 27 except that it is provided with coupling tongues. Specifically, clamp member 26 is channel shaped including an arcuate cross web 33 having a medially positioned circular opening 34 and inwardly diverging side flanges 36 preferably sharpened at their inner edges. Integrally formed with and projecting from the opposite ends of cross web 33 are coaxial arcuate tongues 37 of widths about or slightly less than that of cross webs 28 and 33. In the assembled condition of clamp 12 tongues 37 slidably engage the inside face of web 28 and are longitudinally confined by flanges 29. Each of webs 28 and 33 extends peripherally for less than 180 degrees.

A screw member 38 having an enlarged slotted head 39 includes a threaded shank 40 which engages the threaded inside face of collar 24. A cylindrical pin 41 is integrally formed and coaxial with screw shank 40 and rotatably engages opening 34, the end face of shank 40 bearing on the outside face of web 33. The free end of pin 41 is upset to clinch it and secure it to web 33 while permitting its rotation in opening 34. Positioned in casing front section 17 abutting the inside face of front wall 20 is a washer 42 of a cold flow or elastomeric material, the inside diameter of washer 42 in its normal unstressed condition is a little less than the inside diameter of casing section 14.

Advantageously, a plastic coating 45, such as a blend of acrylics or nylon, is applied to the threaded shank 40, as illustrated in FIG. 3. This coating makes the threaded fastener self-locking and self-sealing so as to resist loosening under vibration. Preferably, coating 45 is colored, such as red, so as to provide an easy visual indication that the fastener is tightened sufficiently. If the color is visible, the screw should be tightened further. If no color is visible, while not a guarantee that the screw has been tightened sufficiently, it is a good indication that it has been so tightened.

In employing coupling device 10 to connect a pair of conduits C, clamps 12 are opened by turning screws 38 to retract the screws and attached clamp members 26 and conduits C are inserted through each respective opening 22 and advanced into abutment with stop ridge 16. The screws 38 are then tightened by means of a screw driver to close the clamps 12 into tight gripping engagement with their corresponding conduits C, the clamp members sharpened edges biting into the corresponding conduit. With the advance of the conduits, pressure is outwardly radially applied to their corresponding washers 42 to effect a tight seal between the conduits and the casing wall 20 and thereby effect a hermetic connection between conduits C.

Figure 4:
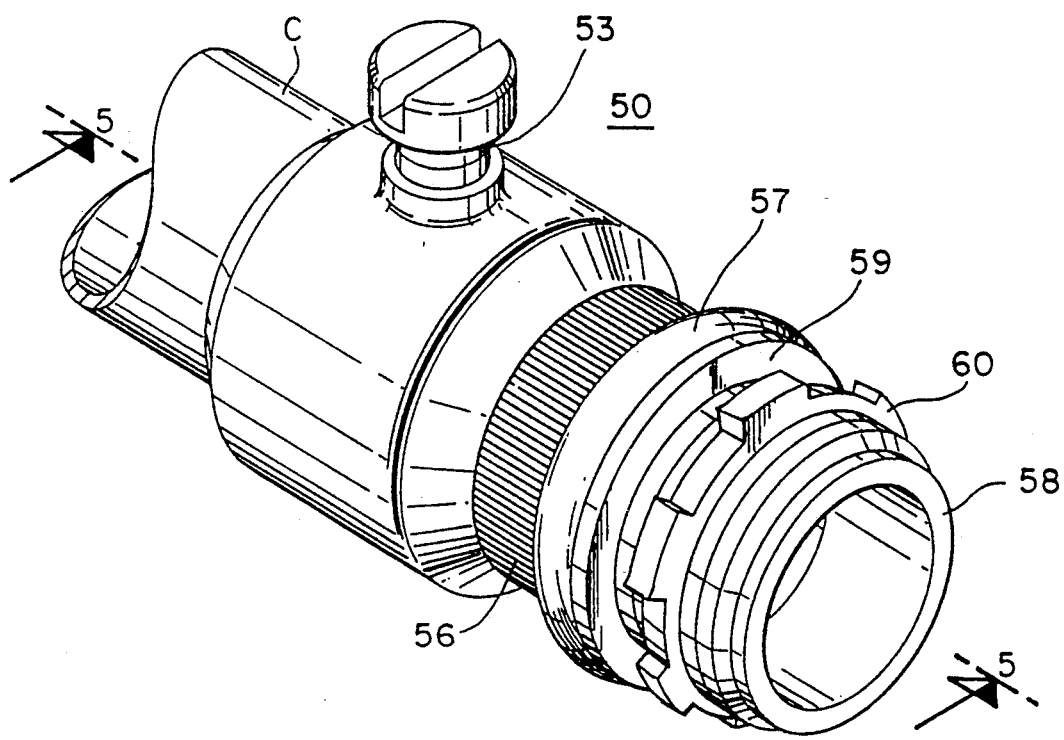
FIG. 4 is a perspective view of another embodiment of the present invention used in a connector for connecting a conduit to a wall opening.
Figure 5:
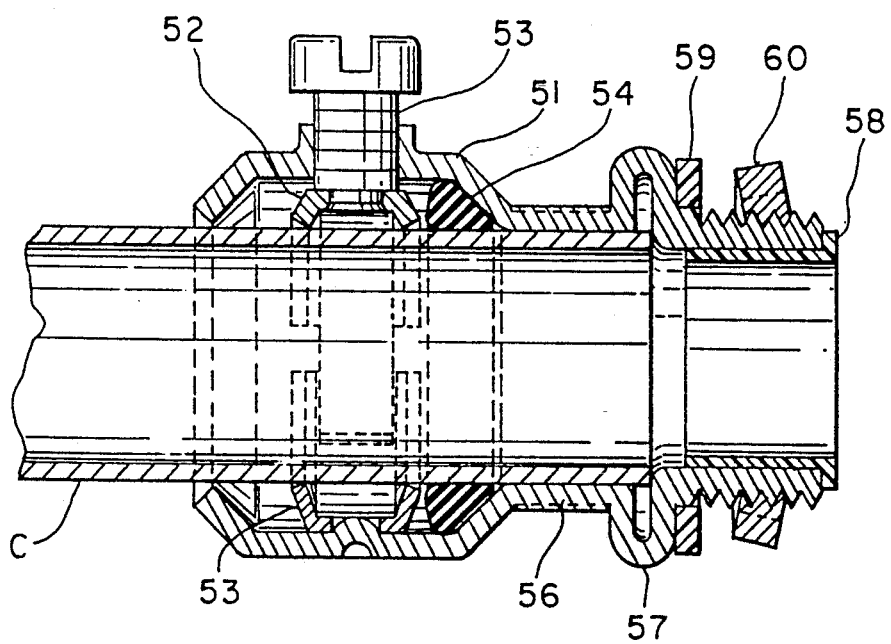
FIG. 5 is a sectional view taken along line 5—5 in FIG. 4.

The embodiment of the present invention shown in FIGS. 4 and 5 differs from that first described in that it is a connector 50 connecting a conduit C to a junction box wall not shown. The improved connector is designated by reference numeral 50 and includes a casing 51 housing a clamp 52 and provided with a clamp tightening screw 53 and a washer 54. The construction, shape, and relationship of casing 51, clamp 52, screw 53 and washer 54 are similar in the construction, shape and relationship of corresponding members of coupling device 10 except it is provided with only one conduit coupling section instead of the two end to end conduit clamping sections of the first embodiment.

The casing 51 includes a cylindrical front casing section 56 terminating in a radially outwardly projecting peripheral ridge 57 integrally formed with front section 56 and a front connecting section 58. Front connecting section 58 is coaxial with and of smaller inside diameter than that of casing front section 56 to provide a rearwardly facing stop defining peripheral shoulder. The outside face of connecting section 58 is threaded and preferably engaged by a rear elastomeric washer 59 and a lock nut 60.

In applying the device 50, it is mounted to the wall of a junction box or the like by removing nut 60, inserting coupling section 58 through a matching opening in the mounting wall and then reapplying and tightening the nut 60 to firmly secure the fitting 50 to the mounting wall. Thereafter, a conduit C is inserted through casing 51 and firmly clamped in position in the manner earlier described.

The embodiments shown are rain-tight/concrete-tight compression fittings eliminating the need for wrenches and rotating the conduit. All that is needed to install this leak-proof fitting is a screwdriver, which is quick and easy. The installer can quickly determined by visual means whether the fitting has been adequately tightened. The installed fitting is then self-sealing and self-locking.

While there have been described and illustrated preferred embodiments of the present invention it is apparent that numerous alterations, omissions and additions may be made without departing from the spirit thereof.

We claim:

1. An electrical conduit coupling device comprising a casing including a tubular wall having a threaded radial bore therein, a semi-circular pair of diametrically opposed mutually peripherally slideably engaged first and second arcuate clamp members housed in said casing and coaxial therewith and means for relatively diametrically moving said clamp members between contracted and expanded positions, a screw member engaging said threaded bore and engaging said first clamp member, and means for restricting the movement of said second clamp member in said casing including mutually engaged projection and recess integrally formed with respective of said casing wall and said second clamp member.

2. The device of claim 1 wherein said recess is formed in said second clamp member and said projection includes a dimple projecting inwardly from said casing tubular wall into engagement with said recess.

3. The device of claim 1 wherein each of said clamp members is channel shaped including an outer cylindrical cross web terminating along its edges in radially inwardly projecting flanges.

4. The device of claim 3 wherein said first clamp member terminates at its opposite end in arcuate tongues slidably engaging the opposite ends of the inside face of said second clamp member cross web between the respective flanges thereon.

5. The device of claim 3 wherein said flanges have sharpened inner free edges.

6. The device of claim 1 wherein said casing includes a radially outwardly projecting tubular section having a threaded inside face defining said threaded bore.

7. The device of claim 1 wherein said first clamp member has formed between the ends thereof a circular opening, said screw member terminating in an integrally formed axial cylindrical projection of reduced diameter rotatably engaging said circular opening.

8. The device of claim 7 wherein the free end of said cylindrical projection is enlarged to interlock said screw and first clamp member against relative radial movement.

9. The device of claim 1 wherein said casing includes a diametrically enlarged rear section in which said clamp members are housed and a forwardly projecting cylindrical front section of reduced diameter.

10. The device of claim 9 wherein the inside radius of said front section is approximately equal to the radius of curvature of said clamp members.

11. The device of claim 9 wherein a circular shoulder delineates said front and rear sections and further including an elastomeric washer abutting said shoulder and in its unstressed condition being of lesser inside diameter than said front section.

12. The device of claim 9 including an annular ridge integrally formed on the inside face of said casing second section forwardly of the rear thereof and defining a conduit stop.

13. The device of claim 9 further comprising a second casing including third and fourth sections similar in construction to and coaxial with said first and second sections, a pair of third and fourth clamp members similar in construction and relationship to said first and second clamp members, said third section having a threaded radial bore, and a screw engaging said third section radial bore and engaging one of said third and fourth clamp members.

14. The device of claim 9 further comprising a tubular cylindrical coupling section joined to and coaxial with said casing front section and having a threaded outside face.

15. An electrical conduit fitting device comprising a casing including a tubular wall having a threaded radial bore therein, a clamp consisting of a semi-circular pair of diametrically opposed mutually peripherally slideably engaged first and second arcuate clamp members housed in said casing and coaxial therewith and means for relatively diametrically moving said clamp members between contracted and expanded positions, a screw member engaging said threaded bore and engaging said first clamp member and means formed on said casing wall and engaging said second clamp member for restricting the movement of said clamp assembly in said casing.

16. The device of claim 15 wherein said clamp member is channel shaped including an outer cylindrical cross web terminating along its edges in radially inwardly projecting flanges.

17. The device of claim 15 wherein on of said first clamp members terminates at its opposite ends in arcuate tongues slidably engaging the opposite ends of the inside face of the cross web of the other of said second clamp members between the respective flanges thereon.

18. The device of claim 15 wherein said flanges have sharpened inner free edges.

* * * * *